(12) United States Patent
Shah

(10) Patent No.: US 12,079,956 B2
(45) Date of Patent: Sep. 3, 2024

(54) METHOD AND DEVICE FOR FUSION OF IMAGES

(71) Applicant: Continental Automotive Systems, Inc., Auburn Hills, MI (US)

(72) Inventor: Kuldeep Shah, St. Jose, CA (US)

(73) Assignee: Continental Autonomous Mobility US, LLC, Auburn Hills, MI (US)

( * ) Notice: Subject to any disclaimer, the term of this patent is extended or adjusted under 35 U.S.C. 154(b) by 251 days.

(21) Appl. No.: 17/133,776

(22) Filed: Dec. 24, 2020

(65) Prior Publication Data

US 2022/0207673 A1     Jun. 30, 2022

(51) Int. Cl.
*G06T 5/50*          (2006.01)

(52) U.S. Cl.
CPC ...... *G06T 5/50* (2013.01); *G06T 2207/20081* (2013.01); *G06T 2207/20221* (2013.01); *G06T 2207/30196* (2013.01); *G06T 2207/30261* (2013.01)

(58) Field of Classification Search
CPC ... G06T 5/50; G06T 7/30; G06T 2207/20221; G06T 2207/30196; G06T 2207/10048; G06T 2207/30252
See application file for complete search history.

(56) References Cited

U.S. PATENT DOCUMENTS

| | | | | |
|---|---|---|---|---|
| 11,017,513 | B1* | 5/2021 | Yarlagadda | G06K 9/626 |
| 2018/0300906 | A1* | 10/2018 | Lu | H04N 9/64 |
| 2019/0147569 | A1* | 5/2019 | Strandemar | G06T 5/003 |
| | | | | 382/255 |
| 2020/0349687 | A1* | 11/2020 | Weng | B64C 39/024 |
| 2021/0233219 | A1* | 7/2021 | Wildermuth | G06T 7/337 |

OTHER PUBLICATIONS

Ivana Shopovska, Deep Visible and Thermal Image Fusion for Enhanced Pedestrian Visibility, Aug. 28, 2019, pp. 7-13 (Year: 2019).*
Fusion of Surveillance Images in Infrared and Visible Band Using Curvelet, Wavelet and Wavelet Packet Transform. International Journal of Wavelets, Multiresolution and Information Processing. Parul Shah. Department of Electrical Engineering, Indian Institute of Technology Bombay Powai, Mumbai—40076 India. Dec. 22, 2009 pp. 1-21.

* cited by examiner

*Primary Examiner* — Kelly L Jerabek

(57) ABSTRACT

A method of fusing images includes obtaining an optical image of a first scene with a first camera. A thermal image of the first scene is obtained with a second camera. The optical image is fused with the thermal image to generate a fused image.

16 Claims, 3 Drawing Sheets

METHOD AND DEVICE FOR FUSION OF IMAGES

BACKGROUND

The present disclosure relates to fusing multiple images from different camera sources into a single fused image.

An interest in autonomous vehicles has been increasing in recent years. In particular, there is a desire to improve the ability of an autonomous vehicle to identify objects on and surrounding a roadway. In order to improve the ability of an autonomous vehicle to operate on a roadway, the autonomous vehicle must be able to properly identify its surrounding environment and objects that might impact its path or speed. However, monitoring the surrounding environment generates a significant amount of data that requires a significant amount of computing power to process. In particular, new data is being continuously generated as the vehicle moves along the roadway. Additionally, because of the nature of autonomous driving, the data obtained must be monitored and evaluated on a real time basis in order to assist in maneuvering the vehicle. Therefore, there is a need to improve the ability for autonomous vehicles to obtain and process data.

SUMMARY

In one exemplary embodiment, a method of fusing images includes obtaining an optical image of a first scene with a first camera. A thermal image of the first scene is obtained with a second camera. The optical image is fused with the thermal image to generate a fused image.

In a further embodiment of any of the above, fusing the optical image with the thermal image includes matching pixels from the optical image with corresponding pixels from the thermal image.

In a further embodiment of any of the above, the fused image includes a field of view less than or equal to a field of view of the optical image and a field of view of the thermal image.

In a further embodiment of any of the above, fusing the optical image with the thermal image includes cropping a portion of at least one of the optical image and the thermal image from the fused image.

In a further embodiment of any of the above, the optical image includes a different perspective of the first scene from the thermal image.

In a further embodiment of any of the above, the optical image includes different distortions of objects in the first scene from the thermal image.

In a further embodiment of any of the above, at least one object appears in one of the thermal image or the optical image but not the other of the thermal image or the optical image.

In a further embodiment of any of the above, fusing the optical image with the thermal image is performed by an algorithm on a central processing unit of a controller.

In a further embodiment of any of the above, the algorithm relies on machine learning for fusing the optical image with the thermal image.

In a further embodiment of any of the above, object detection is performed on the fused image to identify at least one relevant portion of the fused image.

In a further embodiment of any of the above, the machine learning occurs on a central processing unit.

In a further embodiment of any of the above, the first scene includes low light conditions.

In another exemplary embodiment, an assembly for capturing and fusing images includes an optical camera and a thermal camera. A controller is in communication with the optical camera and the thermal camera. The controller is configured for obtaining an optical image of a first scene with a first camera. A thermal image of the first scene is obtained with a second camera. The optical is fused with the thermal image to generate a fused image.

In a further embodiment of any of the above, fusing the optical image with the thermal image includes matching pixels from the optical image with corresponding pixels from the thermal image.

In a further embodiment of any of the above, the fused image includes a field of view less than or equal to a field of view of the optical image and a field of view of the thermal image.

In a further embodiment of any of the above, fusing the optical image with the thermal image includes cropping a portion of at least one of the optical image and the thermal image from the fused image.

In a further embodiment of any of the above, fusing the optical image with the thermal image is performed by an algorithm on a central processing unit of the controller.

In a further embodiment of any of the above, the algorithm relies on machine learning for fusing the optical image with the thermal image.

In a further embodiment of any of the above, object detection is performed on the fused image to identify at least one relevant portion of the fused image.

In a further embodiment of any of the above, performing the object detecting occurs on a graphics processing unit.

BRIEF DESCRIPTION OF THE DRAWINGS

The various features and advantages of the present disclosure will become apparent to those skilled in the art from the following detailed description. The drawings that accompany the detailed description can be briefly described as follows.

DETAILED DESCRIPTION

Figure 1:
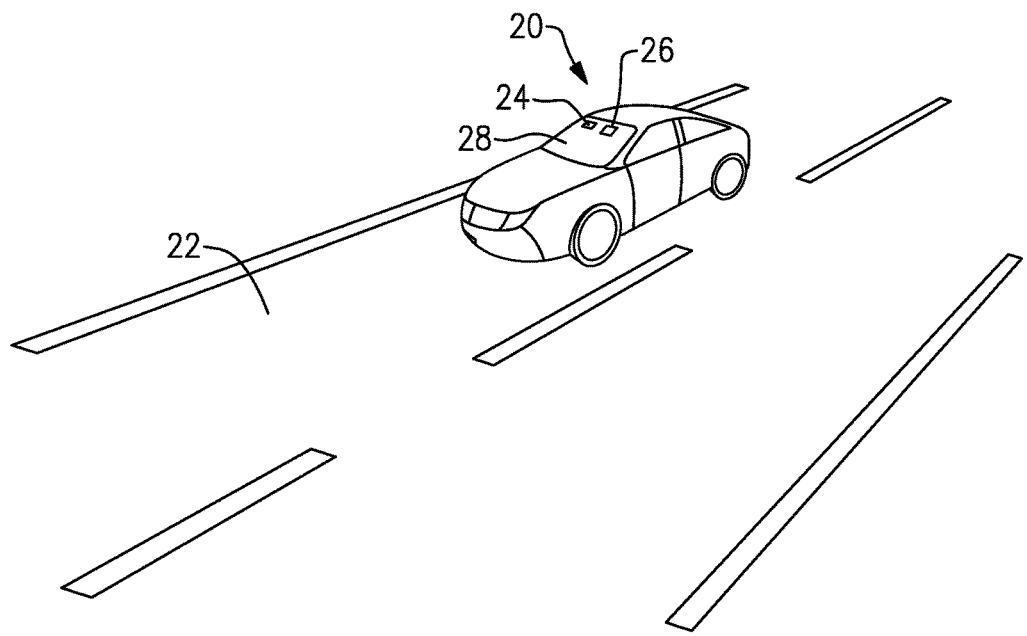
FIG. 1 illustrates an example vehicle incorporating an optical camera and a thermal camera.

FIG. 1 illustrates a vehicle 20 located on a roadway 22. The vehicle 20 includes a camera system having an optical camera 24 and a thermal camera 26 for providing a view of the roadway 22 in front of the vehicle 20. In the illustrated example, the optical camera 24 and the thermal camera 26 are located adjacent to each other, behind the windshield 28 on the vehicle 20 to provide a field of view in front of the vehicle 20.

Figure 2:
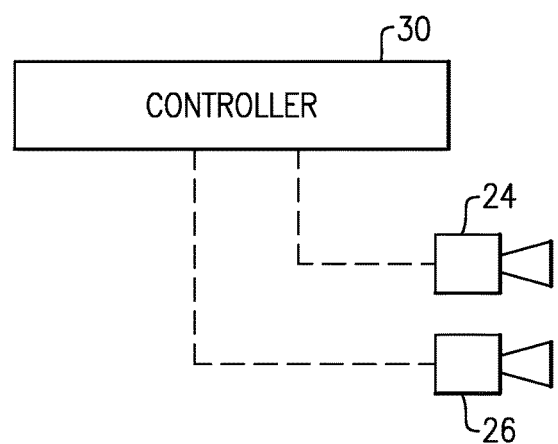
FIG. 2 illustrates a schematic of an example controller in communication with the optical camera and the thermal camera of FIG. 1.

The optical camera 24 and the thermal camera 26 are each in electrical communication with a controller 30 on the vehicle 20 (See FIGS. 1 and 2). The controller 30 includes a central processing unit ("CPU") and memory for performing the operations outlined in greater detail below. Although the optical camera 24 and the thermal camera 26 are illustrated for use on the passenger vehicle 20, other types of vehicles, such as semi-trucks and buses could benefit from this disclosure.

Figure 3:
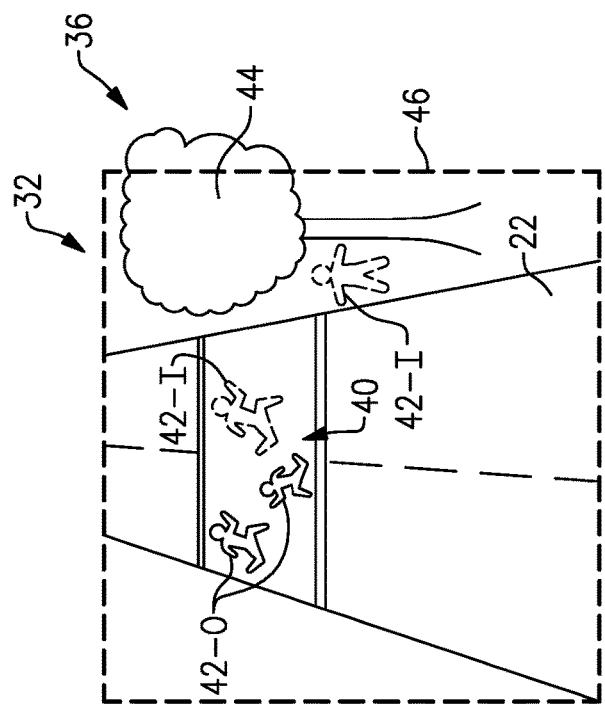
FIG. 3 illustrates a field of view of a scene from the optical camera.
Figure 4:
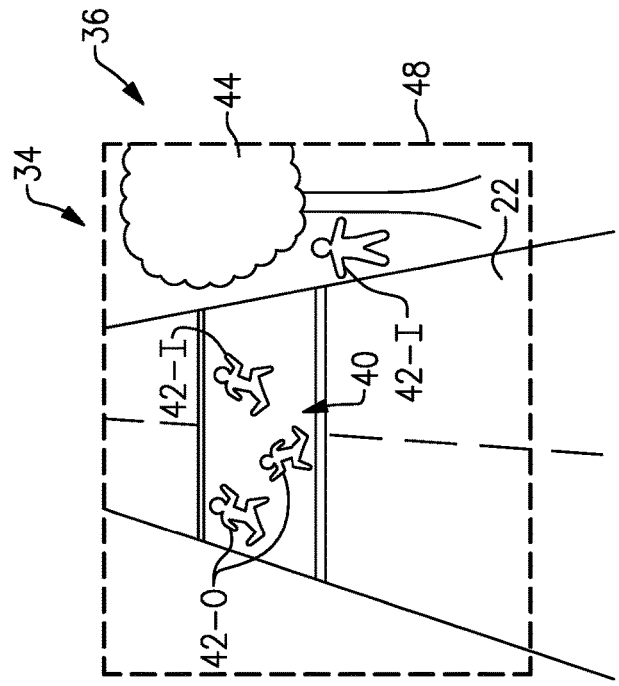
FIG. 4 illustrates a field of view of the scene of FIG. 3 from the thermal camera.
Figure 5:
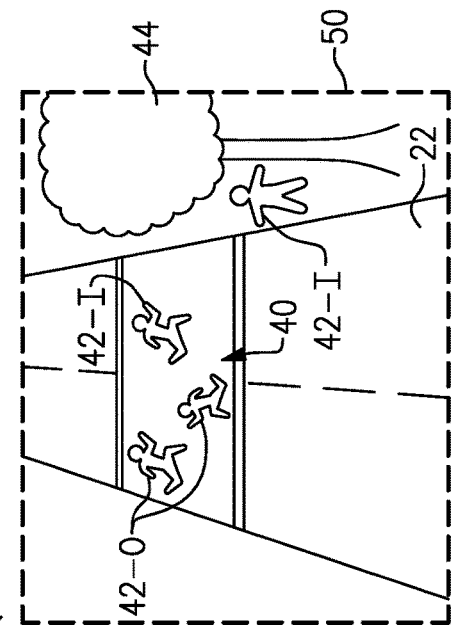
FIG. 5 illustrates a fused image based on and image from the optical camera and an image from the thermal camera.

FIGS. 3-5 illustrate an optical image 32 (FIG. 3) and a thermal image 34 (FIG. 4) of a scene 36 used to generate a fused image 52 (FIG. 5) by combining characteristics both the optical image 32 and the thermal image 34. As shown in FIGS. 3 and 4, the example scene 36 includes the roadway 22 having a crosswalk 40 extending across the roadway 22 and a tree 44 located adjacent the roadway 22. However, as shown in FIG. 3, the optical image 32 only identified the pedestrians 42-O and not the pedestrians 42-I shown in dashed lines. As shown in FIG. 4, the pedestrians 42-I were only visible in the thermal image 34 taken by the thermal camera 26.

FIG. 3 also illustrates a field of view 46 of the optical camera 24. In particular, the field of view of the optical camera 24 omits a portion of the tree 44 in the scene 36 because it is outside of the field of view of the optical camera 24. The field of view of the optical camera 24 can vary depending on an angle of the lens and a position and direction of the optical camera 24 on the vehicle 20.

FIG. 4 illustrates the same scene 36 shown in FIG. 3, but with a field of view 48 from the thermal camera 26. Unlike the field of view 46 from the optical camera 24, the field of view 48 from the thermal camera 26 includes the entire tree 44. However, a section of the roadway 22 adjacent a lower portion of the scene 36 is outside of the field of view 48 of the thermal camera 26 even though it is within the field of view 46 of the optical camera 24 shown in FIG. 3. Therefore, the images 32, 34 capture different elements from the same scene 36 because of the variations in the fields of view 46, 48, respectively.

FIG. 5 illustrates a field of view 50 resulting from fusing the optical image 32 with the thermal image 34 to generate the fused image 52. The fused image 52 includes the pedestrians 42-O that were visible in the optical image 32 and the two additional pedestrians 42-I that were visible in the thermal image 34 and not the optical image 32. The pedestrians 42-I may not have been visible to the optical camera 24 because of low light conditions. Because the thermal camera 26 provides improved low light capability, the additional pedestrians 42-I were included in the fused image 52. The low light conditions can result from the time of day, such as after dusk and before dawn or shade from the tree 44.

In the illustrated example, the fused image 52 is generated entirely with the controller 30. In particular, the fused image 52 is generated through the use of only the CPU on the controller 30. If a graphics processing unit (GPU) was incorporated into the controller 30, it was not needed to the generate the fused image 52. This is accomplished by using the two-dimensional images 32, 34 from the optical camera 24 and the thermal camera 26, respectively. These images 32, 34 require significantly less storage space than a three-dimensional rendering generated by a system incorporating lidar or another three-dimensional image generating approach. Because the images 32, 34 are so much smaller in data size, the CPU on the controller 30 can manage fusing the images 32, 34 into the fused image 52. This reduces the cost of the system by being able to use a lower cost controller 30 with less processing power and may even eliminate the need for the controller 30 to have a GPU.

Additionally, the generation of the fused image 52 reduces the computation steps needed to perform object detection on the scene 36 by another processing unit or a portion of the controller 30. For example, if an object detection algorithm was performed separately on both the optical image 32 and the thermal image 34, more time would be required to perform the two separate object detections. Furthermore, the two separate object detections would need to be merged into a single view to show all of the identified objects from each image. However, once the fused image 52 is generated, only a single object detection algorithm would need to be performed on the fused image 52. This further reduces the computing power needed for systems performing object detection. Furthermore, the fused image could be used in a process other than object detection.

Figure 6:
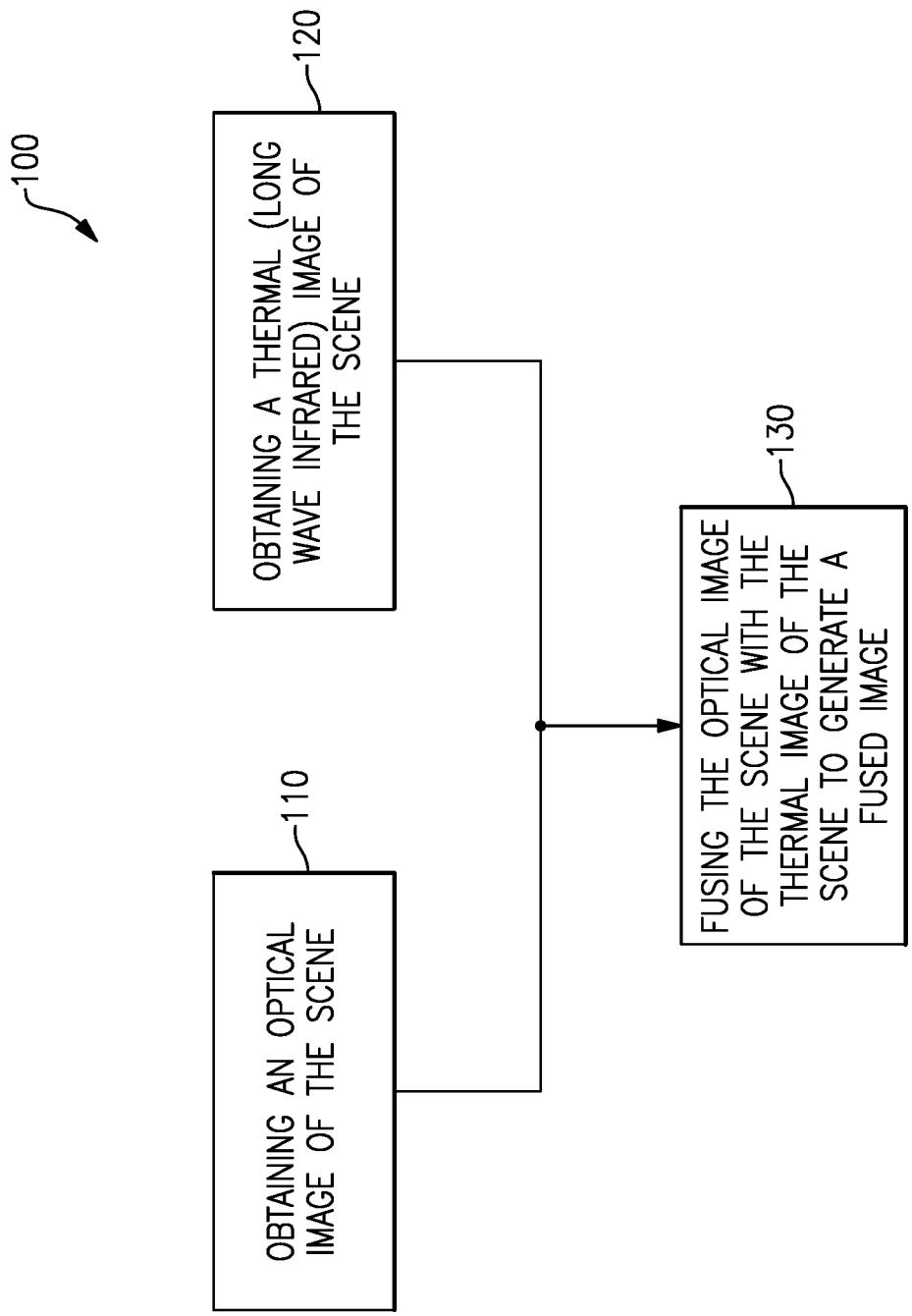
FIG. 6 illustrates a method of fusing the image from the optical camera and with the image from the thermal camera.

FIG. 6 illustrates a method 100 of fusing the optical image 32 with the thermal image 34 to generate the fused image 52. The method 100 includes obtaining the optical image 32 of the scene 36 with the optical camera 24 (Step 110) and obtaining the thermal image 34 of the scene 36 with the thermal camera 26 (Step 120).

Once the optical image 32 and the thermal image 34 have been obtained, the controller 30 can fuse the optical image 32 and the thermal image 34 into the fused image 52 (Step 130). The fusing process includes matching the optical image 32 on a pixel-by-pixel basis with the thermal image 34. As shown in FIGS. 3 and 4, the field of view 46 for the optical image 32 and the field of view 48 for the thermal image 34 do not match perfectly. Also, portions of the optical image 32 and/or the thermal image 34 may be distorted based on the angle of the lens used for each camera 24, 26. For example, if the optical camera 24 included a wider angle lens than the thermal camera 26, then the images 32, 34 created by these two cameras would distort elements differently in the images. This distortion is accounted for by an algorithm that can identify corresponding images between the two images 32, 34 even if they do not match directly on a pixel-by-pixel basis.

Additionally, because portions of the optical image 32 do not appear in the thermal image 34 and vice versa, the fused image 52 will crop portions from the fields of view 46 and 48 when generating the fused image 52. Therefore, the field of view 46 and the field of view 48 should be large enough to provide adequate overlapping coverage of the scene 36 to generate the fused image 52 with a large enough portion of the scene 36 needed to identify relevant objects if used in object detection. Accordingly, the field of view 50 of the fused image 52 is less than or equal to the field of view 46 of the optical image 32 and the field of view 48 of the thermal image 34.

The fusing of the optical image 32 with the thermal image 34 is performed entirely on the CPU in the controller 30 as opposed to being performed on a GPU on the controller 30. The fusing process of the optical image 32 with the thermal image 34 is also performed on a real time basis. One factor contributing to the ability to perform the fusing process on the CPU as opposed to the GPU is the smaller file size of the optical image 32 and the thermal image 34. In particular, some other imaging processors perform object detection on three dimensional space which requires significantly more computing power of a GPU and more storage.

The fusing of the optical image 32 with the thermal image 34 occurs through an algorithm stored on the controller 30. In one example, the algorithm can perform the fusing process through the use of machine learning to find corresponding pixels in the optical image 32 and the thermal image 34. Because the optical image 32 and the thermal image 34 are able to be fused into a single fused image 52, an object detection algorithm can be run on the single fused image 52 instead of running the object detection algorithm separately for both the optical image 32 and the thermal image 34.

By performing object detection on the fused image 52 instead, the number of images that the object detection must be performed on is reduced in half and frees up computing power when performing the object detection. For example, without the fusing process, the object detection algorithm would have to identify relevant objects, such as pedestrians, in both the optical image 32 and the thermal image 34 and then the relevant objects from each would need to be combined into a single representation of all of the relevant objects. However, utilizing the disclosed fusing process, the object detection algorithm can run on the fused image 52 with the relevant portions being identified or highlighted in the fused image 52. Additionally, because the optical image 32 and the thermal image 34 are matched on a pixel by pixel basis, any relevant objects identified in the fused image 52 can be transferred to the either the optical image 32 or the thermal image 34. This allows a user to see the objects detected on the optical image 32 which may be easier to relate the scene 36 than the fused image 52 or the thermal image 34.

Although the different non-limiting examples are illustrated as having specific components, the examples of this disclosure are not limited to those particular combinations. It is possible to use some of the components or features from any of the non-limiting examples in combination with features or components from any of the other non-limiting examples.

It should be understood that like reference numerals identify corresponding or similar elements throughout the several drawings. It should also be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claim should be studied to determine the true scope and content of this disclosure.

What is claimed is:

1. A method of fusing images comprising:
    obtaining, by a central processing unit (CPU) of a controller, an optical image of a first scene with a first camera;
    obtaining, by the CPU, a thermal image of the first scene with a second camera;
    fusing, by the CPU, the optical image with the thermal image to generate a fused image, wherein fusing the optical image with the thermal image includes cropping a portion of at least one of the optical image or the thermal image so as to generate a cropped version of the at least one of the optical image or the thermal image which does not include the cropped portion, the cropped portion corresponding to a portion of the at least one of the optical image or the thermal image which is not included in the other of the at least one of the optical image of the thermal image, and using the cropped version of the at least one of the optical image or the thermal image to generate the fused image,
    wherein fusing the optical image with the thermal image includes matching pixels from the optical image with corresponding pixels from the thermal image on a pixel-by-pixel basis.

2. The method of claim 1, wherein the fused image includes a field of view less than or equal to a field of view of the optical image and a field of view of the thermal image.

3. The method of claim 1, wherein the optical image includes a different perspective of the first scene from the thermal image.

4. The method of claim 1, wherein the optical image includes different distortions of objects in the first scene from the thermal image.

5. The method of claim 1, wherein at least one object appears in one of the thermal image or the optical image but not the other of the thermal image or the optical image.

6. The method of claim 1, wherein fusing the optical image with the thermal image is performed by an algorithm on a central processing unit of a controller.

7. The method of claim 6, wherein the algorithm relies on machine learning for fusing the optical image with the thermal image.

8. The method of claim 7, wherein the machine learning occurs on the CPU.

9. The method of claim 1, including performing object detection on the fused image to identify at least one relevant portion of the fused image.

10. The method of claim 1, wherein the first scene includes low light conditions.

11. An assembly for capturing and fusing images comprising:
    an optical camera;
    a thermal camera;
    a controller comprising a central processing unit (CPU) in communication with the optical camera and the thermal camera, wherein the controller is configured for:
        obtaining, by the CPU, an optical image of a first scene with a first camera;
        obtaining, by the CPU, a thermal image of the first scene with a second camera; and
        fusing, by the CPU, the optical image with the thermal image to generate a fused image, wherein fusing the optical image with the thermal image includes cropping a portion of at least one of the optical image or the thermal image to generate a cropped version of the at least one of the optical image or the thermal image, the cropped portion corresponding to a portion of the at least one of the optical image or the thermal image which is not included in the other of the at least one of the optical image or the thermal image, and using the cropped version of the at least one of the optical image or the thermal image to generate the fused image,
    wherein fusing the optical image with the thermal image includes matching pixels from the optical image with corresponding pixels from the thermal image on a pixel-by-pixel basis.

12. The assembly of claim 11, wherein the fused image includes a field of view less than or equal to a field of view of the optical image and a field of view of the thermal image.

13. The assembly of claim 11, wherein fusing the optical image with the thermal image is performed by an algorithm executed by the CPU of the controller.

14. The assembly of claim 13, wherein the algorithm relies on machine learning for fusing the optical image with the thermal image.

15. The assembly of claim 11, including performing object detection on the fused image to identify at least one relevant portion of the fused image.

16. The assembly of claim 15, wherein performing the object detecting occurs on a graphics processing unit.

\* \* \* \* \*